US012773849B2

(12) United States Patent
Sato et al.

(10) Patent No.: US 12,773,849 B2
(45) Date of Patent: Oct. 27, 2026

(54) CARTRIDGE SET FOR A PRINTING APPARATUS HAVING FIRST AND SECOND CARTRIDGES EACH WITH PROTRUDING PORTIONS

(71) Applicant: CANON KABUSHIKI KAISHA, Tokyo (JP)

(72) Inventors: Kyohei Sato, Kanagawa (JP); Hiroshi Koshikawa, Kanagawa (JP); Tatsuo Nanjo, Kanagawa (JP); Keisuke Iinuma, Kanagawa (JP); Atsushi Kohnotoh, Tokyo (JP); Ken Takenaga, Kanagawa (JP); Daiju Takeda, Kanagawa (JP); Kousuke Tanaka, Kanagawa (JP); Shuhei Yamaguchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 166 days.

(21) Appl. No.: 18/771,686

(22) Filed: Jul. 12, 2024

(65) Prior Publication Data

US 2025/0018723 A1 Jan. 16, 2025

(30) Foreign Application Priority Data

Jul. 14, 2023 (JP) ................................ 2023-115790

(51) Int. Cl.
*B41J 2/175* (2006.01)
*B41J 2/21* (2006.01)
*B41J 25/00* (2006.01)

(52) U.S. Cl.
CPC ....... *B41J 2/17523* (2013.01); *B41J 2/17503* (2013.01); *B41J 2/17509* (2013.01);
(Continued)

(58) Field of Classification Search
CPC ................ B41J 2/17523; B41J 2/17503; B41J 2/17509; B41J 2/17513; B41J 2/1752; B41J 2/17553; B41J 2/2103; B41J 25/001
See application file for complete search history.

(56) References Cited

U.S. PATENT DOCUMENTS 5,530,531 A * 6/1996 Girard ................ G03G 15/0865 222/DIG. 1
6,749,294 B2 * 6/2004 Haldorsen .............. B41J 2/1752 347/49

(Continued)

FOREIGN PATENT DOCUMENTS

JP 2015-193157 11/2015
JP 2017-081084 5/2017

OTHER PUBLICATIONS

U.S. Appl. No. 18/737,989, filed Jun. 8, 2024.

(Continued)

*Primary Examiner* — Henok D Legesse
(74) *Attorney, Agent, or Firm* — Venable LLP

(57) ABSTRACT

A cartridge set including a first cartridge attachable to a first attachment portion in a printing apparatus and a second cartridge attachable to a second attachment portion included in the printing apparatus and that is adjacent to the first attachment portion. The first cartridge includes a first protruding portion, the second cartridge includes a second protruding portion, the first protruding portion protrudes in a direction away from the second attachment portion in a state where the first cartridge is attached to the first attachment portion, the second protruding portion protrudes in a direction away from the first attachment portion in a state where the second cartridge is attached to the second attachment portion. One of the first and the second protruding portions overlap the other in a state where the second (Continued)

cartridge is inserted in the first attachment portion and the first cartridge is inserted in the second attachment portion.

14 Claims, 10 Drawing Sheets

(52) U.S. Cl.
CPC ......... *B41J 2/17513* (2013.01); *B41J 2/1752* (2013.01); *B41J 2/17553* (2013.01); *B41J 2/2103* (2013.01); *B41J 25/001* (2013.01)

(56) References Cited

U.S. PATENT DOCUMENTS

| | | | | |
|---|---|---|---|---|
| 7,150,520 | B2 * | 12/2006 | Shinada | B41J 2/17546 347/49 |
| 2002/0051034 | A1 | 5/2002 | Shinada | B41J 2/175 |
| 2009/0179979 | A1 | 7/2009 | Nanjo et al. | B41J 2/175 |
| 2011/0096128 | A1 | 4/2011 | Ogura et al. | B41J 2/175 |
| 2012/0300003 | A1 | 11/2012 | Takada et al. | B41J 2/175 |
| 2013/0222488 | A1 | 8/2013 | Miyashita et al. | B41J 2/175 |
| 2013/0222491 | A1 | 8/2013 | Nanjo et al. | B41J 2/175 |
| 2015/0375512 | A1 | 12/2015 | Kondo et al. | B41J 2/175 |
| 2015/0375514 | A1 | 12/2015 | Koshikawa et al. | B41J 2/175 |
| 2016/0200113 | A1 | 7/2016 | Nanjo et al. | B41J 2/175 |
| 2016/0200114 | A1 | 7/2016 | Nanjo et al. | B41J 2/175 |
| 2017/0120606 | A1 | 5/2017 | Koshikawa et al. | B41J 2/175 |
| 2017/0120608 | A1 | 5/2017 | Takaoka et al. | B41J 2/175 |
| 2017/0120609 | A1 | 5/2017 | Kimura et al. | B41J 2/175 |
| 2017/0120612 | A1 | 5/2017 | Fukuchi et al. | B41J 2/175 |
| 2017/0120613 | A1 | 5/2017 | Ikebe et al. | B41J 2/175 |
| 2019/0299649 | A1 | 10/2019 | Shimoyama et al. | B41J 2/045 |
| 2020/0079096 | A1 | 3/2020 | Linuma et al. | B41J 2/175 |
| 2021/0300052 | A1 | 9/2021 | Takei et al. | B41J 2/175 |
| 2021/0300055 | A1 | 9/2021 | Koshikawa et al. | B41J 2/175 |
| 2021/0362506 | A1 | 11/2021 | Kishikawa et al. | B41J 2/175 |
| 2022/0009244 | A1 | 1/2022 | Matsumura et al. | B41J 2/175 |
| 2022/0032633 | A1 | 2/2022 | Shimada et al. | B41J 2/175 |
| 2022/0097388 | A1 | 3/2022 | Nanjo et al. | B41J 2/175 |
| 2022/0258486 | A1 | 8/2022 | Kohnotoh | B41J 2/175 |
| 2023/0135411 | A1 | 5/2023 | Koshikawa | B41J 2/175 |
| 2023/0139685 | A1 | 5/2023 | Koshikawa | B41J 2/175 |
| 2023/0405995 | A1 | 12/2023 | Shimada et al. | B41J 2/175 |
| 2024/0286787 | A1 | 8/2024 | Noda et al. | B65D 1/36 |
| 2024/0300245 | A1 | 9/2024 | Hayasaka et al. | B41J 2/175 |
| 2024/0343044 | A1 | 10/2024 | Kondo et al. | B41J 2/175 |

OTHER PUBLICATIONS

U.S. Appl. No. 18/752,383, filed Jun. 24, 2024.
U.S. Appl. No. 18/762,423, filed Jul. 2, 2024.
U.S. Appl. No. 18/778,955, filed Jul. 20, 2024.

* cited by examiner

CARTRIDGE SET FOR A PRINTING APPARATUS HAVING FIRST AND SECOND CARTRIDGES EACH WITH PROTRUDING PORTIONS

Cross-Reference to Priority Application

This application claims the benefit of Japanese Patent Application No. 2023-115790, filed Jul. 14, 2023, which is hereby incorporated by reference herein in its entirety.

BACKGROUND

Field of the Invention

The present disclosure relates to a cartridge, a cartridge set, and a printing apparatus.

Description of the Related Art

A printing apparatus capable of performing printing by ejecting liquids to a print medium generally includes an erroneous attachment suppression mechanism to suppress erroneous attachment of liquid containers storing the liquids in some cases. In a case when the printing apparatus performs a printing operation with the liquid containers erroneously attached, there is a possibility that an image cannot be correctly printed or a possibility that the printing apparatus fails.

Japanese Patent Laid-Open No. 2017-81084 discloses a head cartridge that can be attached to a carriage and that includes a liquid ejection portion configured to eject a liquid and a liquid storing portion configured to supply the liquid to the liquid ejection portion, the liquid ejection portion and the liquid storing portion being integral. Japanese Patent Laid-Open No. 2017-81084 illustrates that the head cartridge includes a lid member and a protruding portion serving as an indicator mark for a user is formed on a side surface of the lid member. Forming the protruding portion on the side surface of the lid member included in the head cartridge suppresses the case when the head cartridge is erroneously attached to the carriage in a state where the head cartridge is arranged other way around in the front-rear direction or the up-down direction.

However, Japanese Patent Laid-Open No. 2017-81084 describes nothing about attaching two or more head cartridges to the printing apparatus. Accordingly, in the head cartridge of Japanese Patent Laid-Open No. 2017-81084, in the case when two head cartridges are to be attached side by side, the carriage requires a housing space that includes a space for the protruding portions of the respective two head cartridges. Accordingly, there is a possibility of an increase in the size of the carriage and an increase in the size of the printing apparatus main body.

SUMMARY

An object of the present disclosure is to provide a technique that enables avoiding of erroneous attachment of multiple cartridges.

In an aspect of the present disclosure, a cartridge set includes a first cartridge attachable to a first attachment portion included in a printing apparatus, and a second cartridge attachable to a second attachment portion, which is included in the printing apparatus and, which is adjacent to the first attachment portion, wherein the first cartridge includes a first protruding portion; the second cartridge includes a second protruding portion, the first protruding portion protrudes in a direction away from the second attachment portion in a state where the first cartridge is attached to the first attachment portion, the second protruding portion protrudes in a direction away from the first attachment portion in a state where the second cartridge is attached to the second attachment portion, and one of the first protruding portion and the second protruding portion overlaps the other in a state where the second cartridge is inserted in the first attachment portion and the first cartridge is inserted in the second attachment portion.

Further features of the present disclosure will become apparent from the following description of exemplary embodiments with reference to the attached drawings.

DESCRIPTION OF THE EMBODIMENTS

Figure 1:
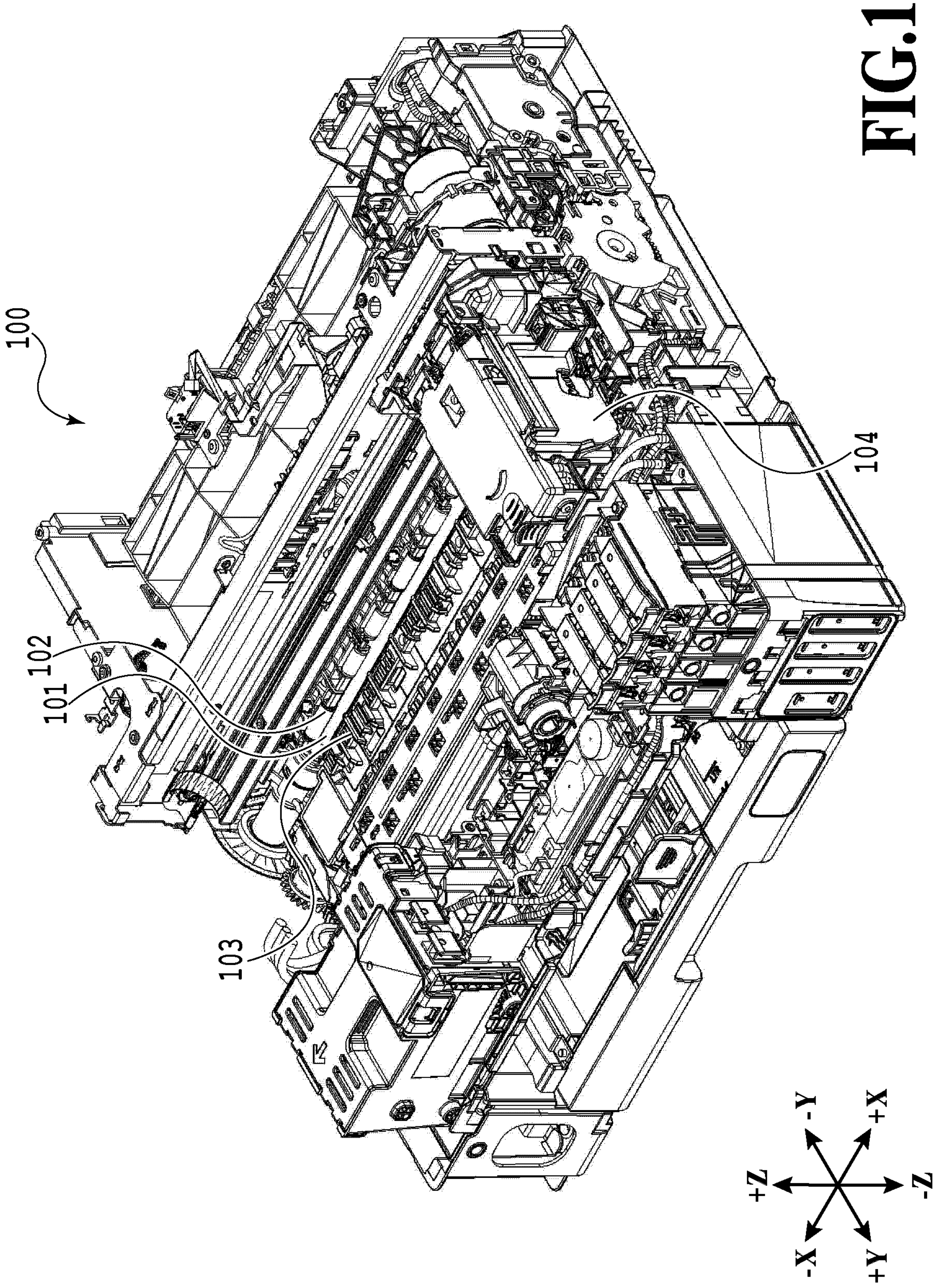
FIG. 1 is an outer appearance perspective view illustrating an example of a printing apparatus in one embodiment.

Hereafter, with reference to the attached drawings, the present disclosure is explained in detail in accordance with preferred embodiments. Configurations shown in the following embodiments are merely exemplary and the present disclosure is not limited to the configurations shown schematically.

First Embodiment

The present embodiment is explained below in detail with reference to the attached drawings. Note that the configurations that are the same among the drawings are explained by being denoted by the same reference numerals.

<Outline of Printing Apparatus 100>

FIG. 1 is an outer appearance perspective view illustrating an outline of a printing apparatus 100 in the present embodiment. Coordinate axes in the drawings are explained. In the drawings referred to in the present specification, an X direction and a Y direction indicate two directions orthogonal to each other on a horizontal plane. AZ direction indicates a vertical direction. A +Y direction indicates a forward direction of the printing apparatus 100, a −Y direction indicates a rearward direction, a −X direction indicates a leftward direction as viewed by the observer from the front side of the printing apparatus 100, a +X direction indicates a rightward direction, a +Z direction indicates an upward direction, and a −Z direction indicates a downward direction. In the following explanation, upward, downward, left, and right indicate directions as viewed by the observer from the front side of the printing apparatus 100 in a posture in a case when the printing apparatus 100 is used in a normal state, unless otherwise noted. In this state, the X, Y, and Z directions correspond to the width, length, and height of a head cartridge (to be described later), respectively.

In the present embodiment, an explanation is given assuming that liquids are inks. However, the liquids are not limited to the inks.

"Printing" (also referred to as "print") does not only mean formation of meaningful information such as characters and figures. The term "printing" also means formation of meaningless information. The "printing" widely means the case when an image, a design, a pattern, a structure, or the like, is formed on a print medium or the case when a medium is processed, irrespective of whether or not the formed or processed objects are made apparent to be visually noticeable to humans.

The "print medium" means not only a general print sheet, but also media such as cloth, a plastic film, a metal plate, glass, ceramic, resin, wood, and leather that can receive the liquids.

As illustrated in FIG. 1, the printing apparatus 100 (for example, an inkjet printer) includes a conveyance roller 101 configured to convey the print medium (not illustrated), a pinch roller 102 configured to be driven by following the conveyance roller 101, and a platen 103 capable of supporting the conveyed print medium. Moreover, the printing apparatus 100 includes a carriage 104 to which one cartridge set including multiple cartridges can be attached, a feeding roller (not illustrated) configured to feed the print medium, and a discharge roller (not illustrated) configured to discharge the print medium to a discharge tray (not illustrated).

In the present embodiment, a head cartridge is mounted on the carriage 104 in an attachable and detachable manner. In the case when the printing operation by the printing apparatus 100 is performed, the print medium is conveyed onto the platen 103 while being held between the conveyance roller 101 and the pinch roller 102. The platen 103 is arranged at a position where the platen 103 faces the head cartridge mounted on the carriage 104. The liquids are ejected from the head cartridge mounted on the carriage 104 capable of reciprocally moving in a scanning direction (±X directions) to the print medium, and an image is thereby formed. Specifically, a conveyance operation of intermittently conveying the print medium in a conveyance direction (+Y direction in the drawings) and print scanning of ejecting the liquids to the conveyed print medium while causing the carriage 104 to move in the ±X directions are alternately performed, and an image is thereby formed. The print medium, on which the image is formed, is discharged to the discharge tray by the discharge roller.

<Control of Printing Apparatus 100>

Figure 2:
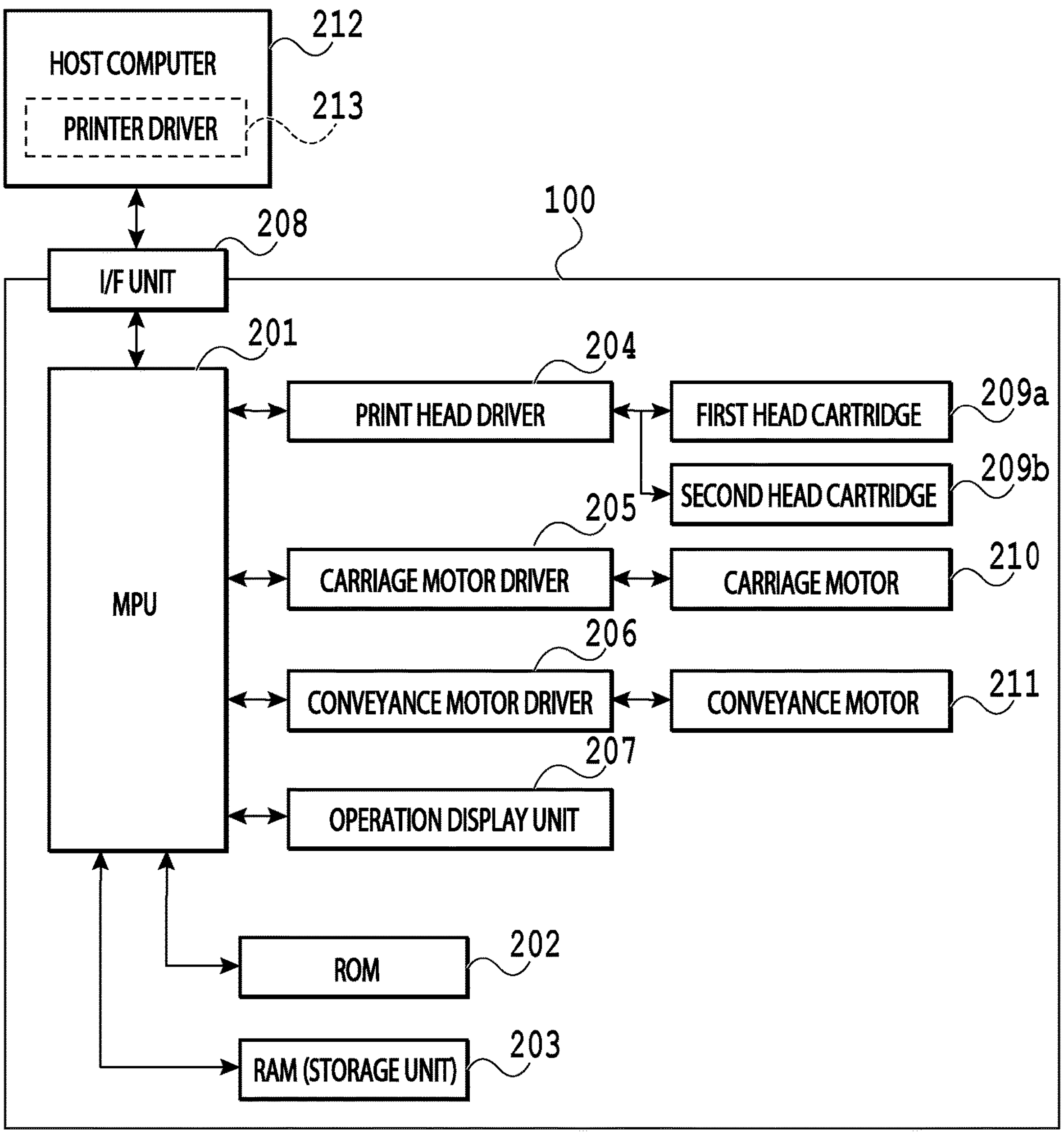
FIG. 2 is a block diagram illustrating an example of control in the printing apparatus that can be applied to one embodiment.

FIG. 2 is a block diagram illustrating a configuration of control in the printing apparatus 100 that can be applied to the present embodiment.

As illustrated in FIG. 2, the printing apparatus 100 includes an MPU 201 configured to control the entire apparatus, a ROM 202 in which programs and various pieces of data executed by the MPU 201 are stored, and a RAM 203 capable of temporarily storing data. The MPU 201 and the ROM 202 are connected to each other via a bus. The MPU 201 and the RAM 203 are connected to each other via the bus.

The printing apparatus 100 includes a print head driver 204, a carriage motor driver 205, a conveyance motor driver 206, an operation display unit 207, and an interface unit (I/F unit) 208 that are connected to the MPU 201 via the bus.

A first head cartridge 209*a* and a second head cartridge 209*b* are connected to the print head driver 204 via the bus by being attached to the carriage 104. The printing apparatus 100 includes a carriage motor 210 configured to drive the carriage 104. The carriage motor 210 is connected to the carriage motor driver 205 via the bus. The printing apparatus 100 includes a conveyance motor 211 configured to drive the conveyance roller. The conveyance motor 211 is connected to the conveyance motor driver 206 via the bus.

A host computer 212 includes a printer driver 213 configured to exchange image data and data including quality of an image to be printed and the like with the printing apparatus 100 in the case when a user gives a command to execute printing.

The MPU 201 exchanges a print image, and the like, with the host computer 212 via the I/F unit 208. The MPU 201 controls the entire apparatus according to the programs, parameters, and the like, stored in the ROM 202 while using the RAM 203 as a work area. For example, in the case when a command for performing printing is inputted from the host computer 212 arranged outside the printing apparatus 100 via the I/F unit 208, the MPU 201 loads the received image data onto the RAM 203.

The MPU 201 performs predetermined image processing on the image data according to the program, parameters, and the like, stored in the ROM 202, and generates print data used to cause the first head cartridge 209*a* and the second head cartridge 209*b* to perform printing. The print head driver 204 drives the first head cartridge 209*a* and the second head cartridge 209*b* according to the print data loaded onto the RAM 203, under an instruction of the MPU 201. The carriage motor driver 205 drives the carriage motor 210 under the instruction of the MPU 201 to reciprocally move the carriage 104 at predetermined speed. The conveyance motor driver 206 drives the conveyance motor 211 under an instruction of the MPU 201 to drive the conveyance roller.

The operation display unit 207 includes a display, as well as a button and a key group including multiple keys that can be pressed by the user. The display can display a state of the printing apparatus 100, various menu screens, main body information of the printing apparatus 100, and the like. The button and the key group can receive input of various instructions such as printing from the user.

<Carriage 104>

Figure 3B:
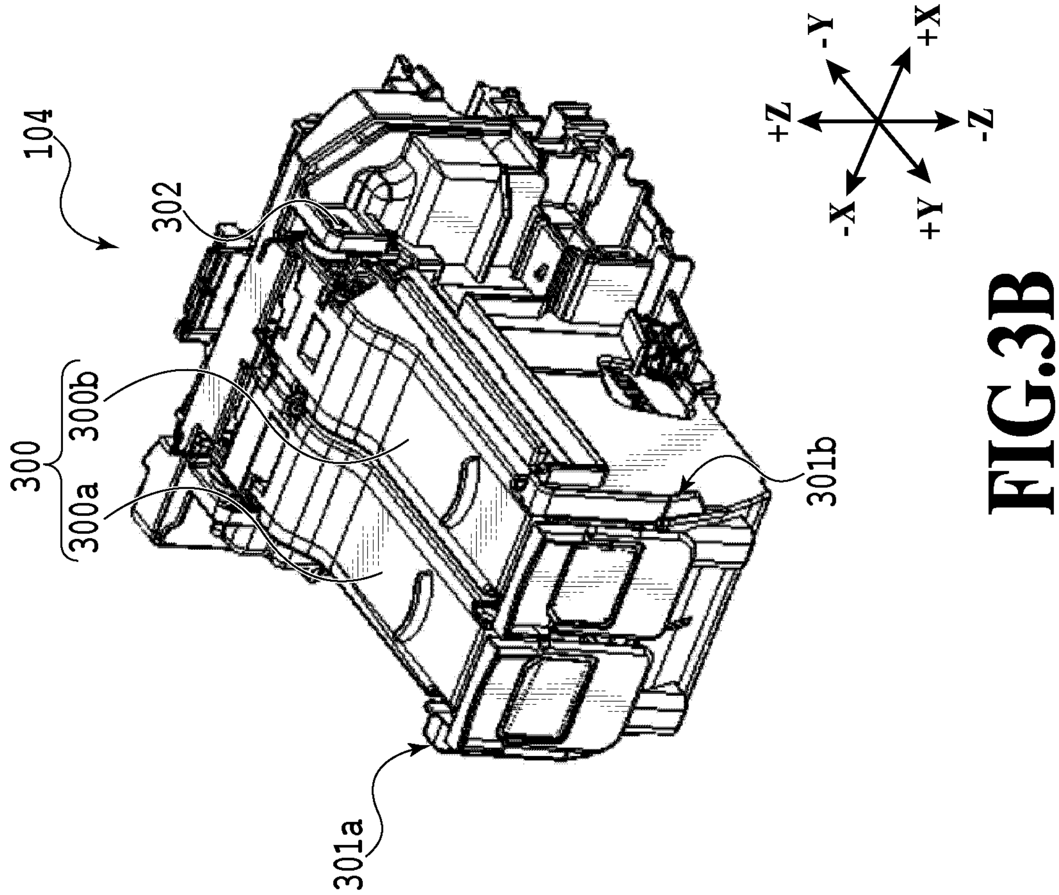
FIG. 3B is a perspective view illustrating a state where the cover of the carriage is closed.
Figure 3A:
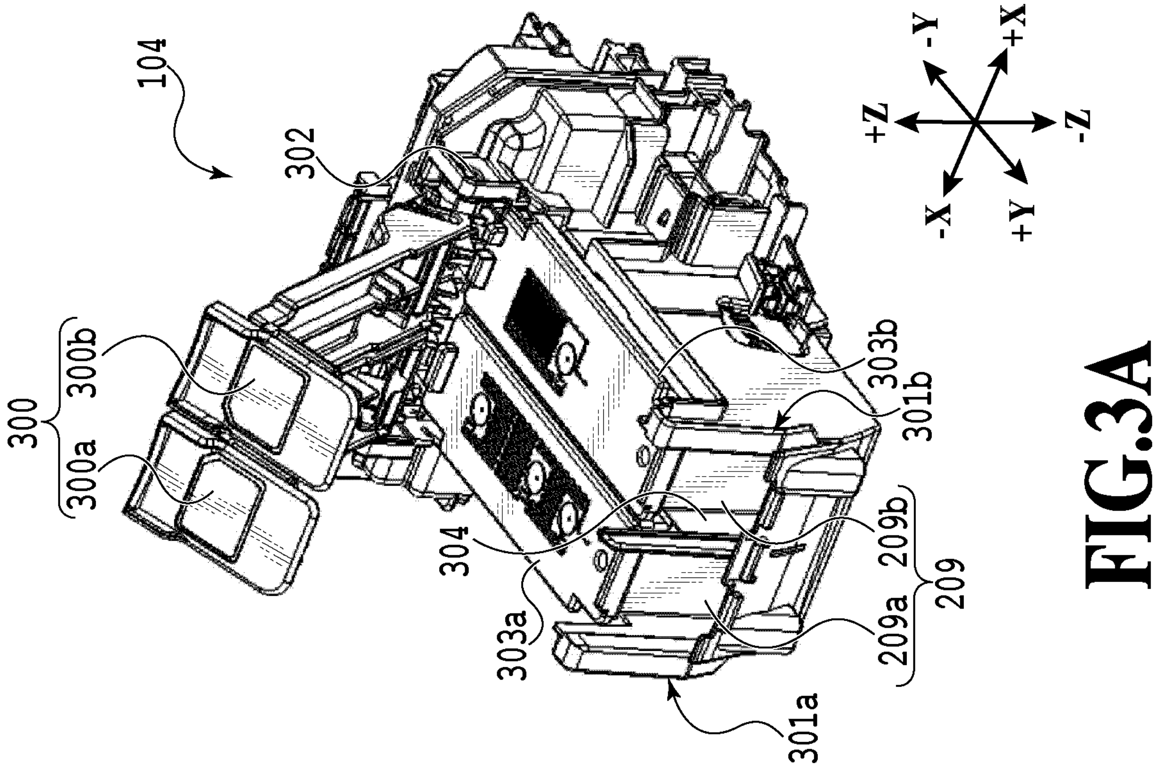
FIG. 3A is a perspective view illustrating a state where a cover provided in a carriage is opened.

FIG. 3A is a perspective diagram illustrating a state where a cover 300 provided in the carriage 104 is opened.

As illustrated in FIG. 3A, the carriage 104 includes a first attachment portion 301*a* for attaching the first head cartridge 209*a* and a second attachment portion 301*b* for attaching the second head cartridge 209*b*. The first attachment portion 301*a* and the second attachment portion 301*b* are formed on the carriage 104 to be adjacent to each other. In the present embodiment, the first attachment portion 301*a* is arranged on the left side (−X direction side in FIG. 3A) as viewed by the observer from the front side of the carriage 104. Meanwhile, the second attachment portion 301*b* is arranged on the right side (+X direction side in FIG. 3A) as viewed by the observer from the front side of the carriage 104. As described above, the cartridge set of the present embodiment includes the first head cartridge 209*a* that can be attached to and detached from the first attachment portion 301*a* and the second head cartridge 209*b* that can be attached to and detached from the second attachment portion 301*b* adjacent to the first attachment portion 301*a*. The first head cartridge 209*a* and the second head cartridge 209*b* have box shapes that are substantially the same.

The carriage 104 includes a first cover 300*a* that is movable between a fixing position (first position) where the first cover 300*a* fixes the first head cartridge 209*a* attached to the first attachment portion 301*a* and a release position (second position) where the first head cartridge 209*a* is not fixed and released. The carriage 104 includes a second cover 300*b* that is movable between a fixing position (third position) where the second cover 300*b* fixes the second head cartridge 209*b* attached to the second attachment portion 301*b* and a release position (fourth position) where the second head cartridge 209*b* is not fixed and released.

The carriage 104 includes one rotation shaft 302 that pivotally supports the first cover 300*a* and the second cover 300*b* such that the first cover 300*a* and the second cover 300*b* can be freely opened and closed. The first cover 300*a* can freely pivotally move between the first position where the first cover 300*a* fixes the first head cartridge 209*a* and the second position where the first head cartridge 209*a* is attachable and detachable. The second cover 300*b* can freely pivotally move between the third position where the second cover 300*b* fixes the second head cartridge 209*b* and the fourth position where the second head cartridge 209*b* is attachable and detachable.

The first head cartridge 209*a* can store and eject a first type of liquid. In the present embodiment, the first head cartridge 209*a* can store and eject three types of chromatic color inks of yellow, magenta, and cyan.

Meanwhile, the second head cartridge 209*b* can store and eject a second type of liquid (for example, ink of black color). Hereafter, in the case when there is no need to particularly distinguish the first head cartridge 209*a* and the second head cartridge 209*b* from each other, the first head cartridge 209*a* and the second head cartridge 209*b* are referred to as head cartridges 209.

Attachment and detachment of the first head cartridge 209*a* are performed in a state where the first cover 300*a* is opened. Meanwhile, attachment and detachment of the second head cartridge 209*b* are performed in a state where the second cover 300*b* is opened.

In the present embodiment, the first head cartridge 209*a* includes a first protruding portion 303*a* that protrudes in a direction away from the second attachment portion 301*b* (−X direction in the drawings) in a state where the first head cartridge 209*a* is attached to the first attachment portion 301*a*. Meanwhile, the second head cartridge 209*b* includes a second protruding portion 303*b* that protrudes in a direction away from the first attachment portion 301*a* (+X direction in the drawings) in a state where the second head cartridge 209*b* is attached to the second attachment portion 301*b*.

The carriage 104 includes a wall 304 that partitions the first attachment portion 301*a* and the second attachment portion 301*b*. Note that the thickness (length in the X direction in the drawings) of the wall 304 is about 1.0 mm.

FIG. 3B is a perspective view illustrating a state where the cover 300 of the carriage 104 is closed.

As illustrated in FIG. 3B, the first cover 300*a* is configured to be pivotally movable about the rotation shaft 302 between the release position (above-mentioned second position) and the fixing position (above-mentioned first position). Closing the first cover 300*a* in the state where the first head cartridge 209*a* is inserted in the first attachment portion 301*a* causes the first head cartridge 209*a* to be attached to the first attachment portion 301*a*.

The carriage 104 is configured such that, in the case when the head cartridges 209 are not appropriately inserted in the first attachment portion 301*a* and the second attachment portion 301*b*, respectively, both of the first cover 300*a* and the second cover 300*b* cannot be closed.

The first cover 300*a* is configured to be unmovable from the release position to the fixing position in the state where the second head cartridge 209*b* is inserted in the first attachment portion 301*a*. Moreover, the carriage 104 is configured not to move in the scanning direction in the state where the first cover 300*a* is not closed. Note that the first cover 300*a* is opened again in the case when the attached first head cartridge 209*a* is to be removed.

The second cover 300*b* is configured to be pivotally movable about the rotation shaft 302 between the release position (the above-mentioned fourth position) and the fixing position (the above-mentioned third position). Closing the second cover 300*b* in the state where the second head cartridge 209*b* is inserted in the second attachment portion 301*b* causes the second head cartridge 209*b* to be attached to the carriage 104. Note that the second cover 300*b* is opened again in the case when the attached second head cartridge 209*b* is to be removed.

In the present embodiment, the second cover 300*b* is configured to be unmovable from the release position to the fixing position in the state where the first head cartridge 209*a* is inserted in the second attachment portion 301*b*. Moreover, the carriage 104 is configured not to move in the scanning direction in the state where the second cover 300*b* is not closed.

According to such a configuration, it is possible to suppress a case when a print operation starts in a state where one or both of the first head cartridge 209*a* and the second head cartridge 209*b* are erroneously attached to the carriage 104. Specifically, a failure of the printing apparatus can be suppressed. A configuration for preventing erroneous attachment of the cartridge to each of the two attachment portions is explained below in detail.

<First Head Cartridge 209*a*>

Figure 4:
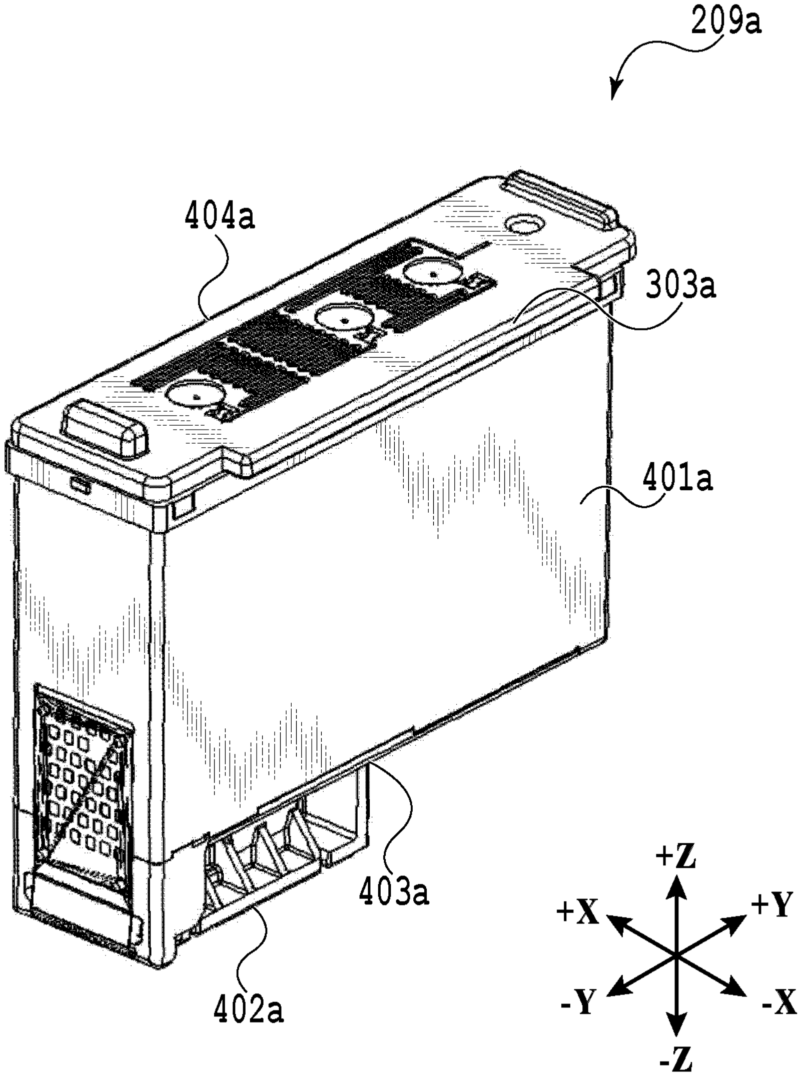
FIG. 4 is an outer appearance perspective view illustrating an example of a head cartridge that can be applied to one embodiment.

FIG. 4 is an outer appearance perspective view of the first head cartridge 209*a* that can be applied to the present embodiment.

As illustrated in FIG. 4, the first head cartridge 209*a* includes a first storing portion 401*a* capable of storing the first type of liquid and a first ejection portion 402*a* capable of ejecting the first type of liquid. Note that three liquid chambers capable of independently storing the ink of three colors described above are arranged side by side in the conveyance direction (Y direction) inside the first storing portion 401*a*. Moreover, the first head cartridge 209*a* includes a first flow channel portion 403*a*, in which flow channels connecting the first storing portion 401*a* and the first ejection portion 402*a* are formed.

The first ejection portion 402*a* includes a first ejection element substrate (not illustrated) capable of ejecting the first type of liquid supplied from the first storing portion 401*a* via the first flow channel portion 403*a*. The first ejection element substrate includes electrothermal conversion elements (for example, not-illustrated heaters) as ejection energy generating elements (pressure generating elements) configured to generate energy for ejecting the first type of liquid filling pressure chambers (not illustrated). The electrothermal conversion elements are located closer to a flow-out channel (not illustrated) than to a supply channel (not illustrated), together with ejection ports (not illustrated) and the pressure chambers (not illustrated). For example, the electrothermal conversion elements are driven to generate heat and to cause bubbling in the first type of liquid filling the pressure chambers (not illustrated), and the first type of liquid can be ejected from the ejection ports (not illustrated) by using energy of this bubbling. Note that piezoelectric elements, and the like, can be given as other examples of the ejection energy generating elements that can be applied to the present embodiment.

In the present embodiment, the first head cartridge 209*a* includes a first lid portion 404*a* that covers an opening formed in an upper portion of the first storing portion 401*a*. The first protruding portion 303*a* protruding in a first direction (−X direction in the drawings in the present example) is formed on a first side surface (surface facing the −X direction in the drawings in the present example) of the first lid portion 404*a*.

In the present embodiment, the first protruding portion 303*a* is formed to protrude 3.2 mm or more and 4.5 mm or less in the −X direction from the first side surface of the first lid portion 404*a*. The width (length in the X direction) of the first head cartridge 209*a* is about 22.0 mm, excluding the first protruding portion 303*a*.

<Second Head Cartridge 209*b*>

Figure 5:
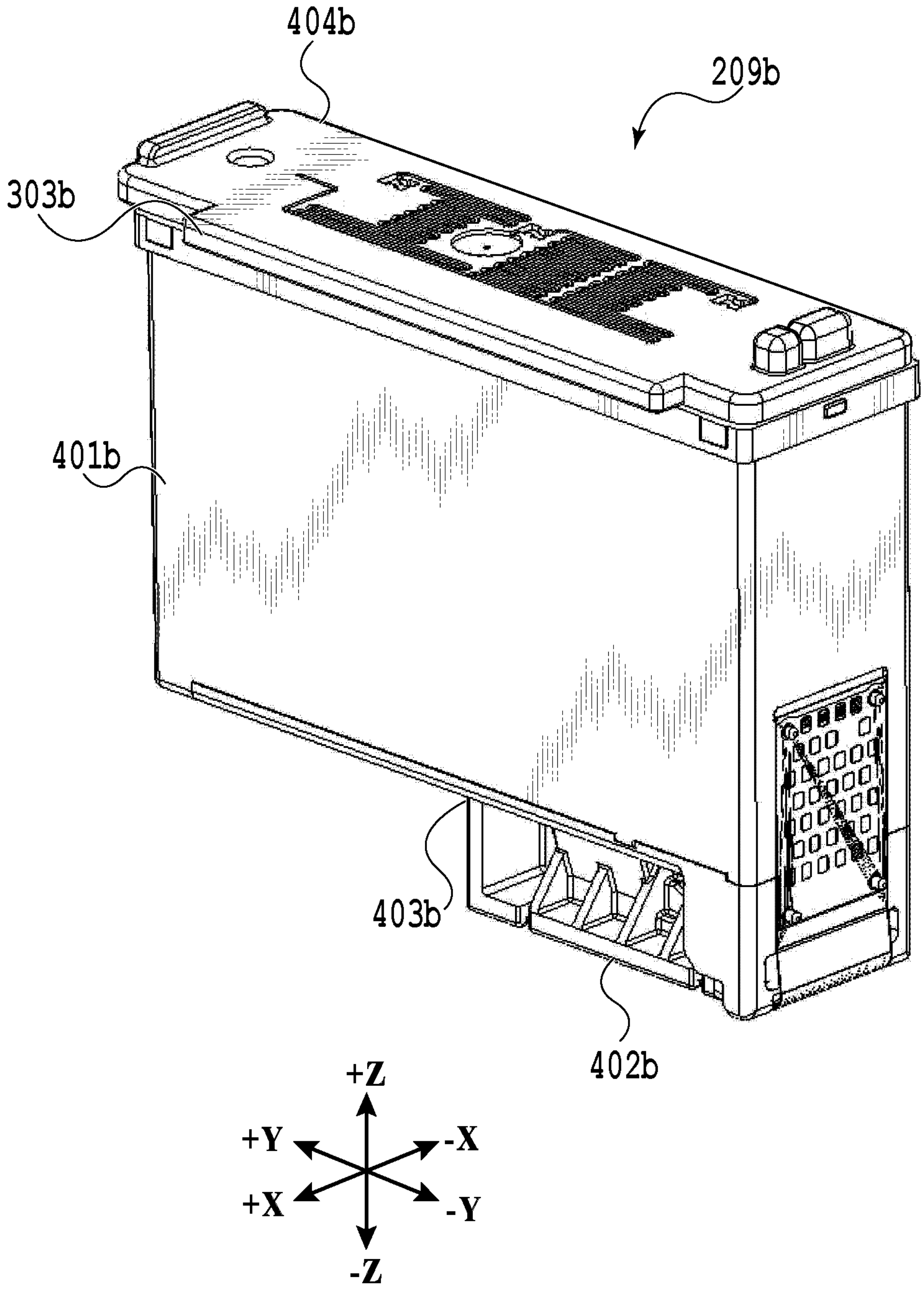
FIG. 5 is an outer appearance perspective view illustrating an example of a head cartridge that can be applied to one embodiment.

FIG. 5 is an outer appearance perspective view of the second head cartridge 209*b* that can be applied to the present embodiment.

As illustrated in FIG. 5, the second head cartridge 209*b* includes a second storing portion 401*b* that can store the second type of liquid different in type from the liquid that can be stored in the first storing portion included in the first head cartridge 209*a*. The second head cartridge 209*b* includes a second ejection portion 402*b* that can eject the second type of liquid. Moreover, the second head cartridge 209*b* includes a second flow channel portion 403*b* in which flow channels connecting the second storing portion 401*b* and the second ejection portion 402*b* are formed.

The second ejection portion 402*b* includes a second ejection element substrate (not illustrated) capable of ejecting the second type of liquid supplied from the second storing portion 401*b* via the second flow channel portion 403*b*. The second ejection element substrate includes electrothermal conversion elements (for example, not-illustrated heaters) as ejection energy generating elements (pressure generating elements) configured to generate energy for ejecting the second type of liquid filling pressure chambers (not illustrated). The electrothermal conversion elements are located closer to a flow-out channel (not illustrated) than to a supply channel (not illustrated), together with ejection ports (not illustrated) and the pressure chambers (not illustrated). For example, the electrothermal conversion elements are driven to generate heat and to cause bubbling in the second type of liquid filling the pressure chambers (not illustrated), and the second type of liquid can be ejected from the ejection ports (not illustrated) by using energy of this bubbling. Note that piezoelectric elements, and the like can be given as other examples of the ejection energy generating elements that can be applied to the present embodiment.

In the present embodiment, the second head cartridge 209*b* includes a second lid portion 404*b* that covers an opening formed in an upper portion of the second storing portion 401*b*. The second protruding portion 303*b* protruding in a second direction (+X direction in the drawings in the present example) is formed on a second side surface (surface facing the +X direction in the drawings in the present example) of the second lid portion 404*b*.

In the present embodiment, the second protruding portion 303*b* is formed to protrude 3.2 mm or more and 4.5 mm or less in the second direction from the second side surface of the second lid portion 404*b*. The width (length in the X direction) of the second head cartridge 209*b* is about 22.0 mm, excluding the second protruding portion 303*b*. As described above, the first head cartridge 209*a* and the second head cartridge 209*b* have substantially the same size and shape, excluding the positions where the first protruding portion 303*a* and the second protruding portion 303*b* are arranged.

<Interval Between First Head Cartridge 209*a* and Second Head Cartridge 209*b*>

Figure 6:
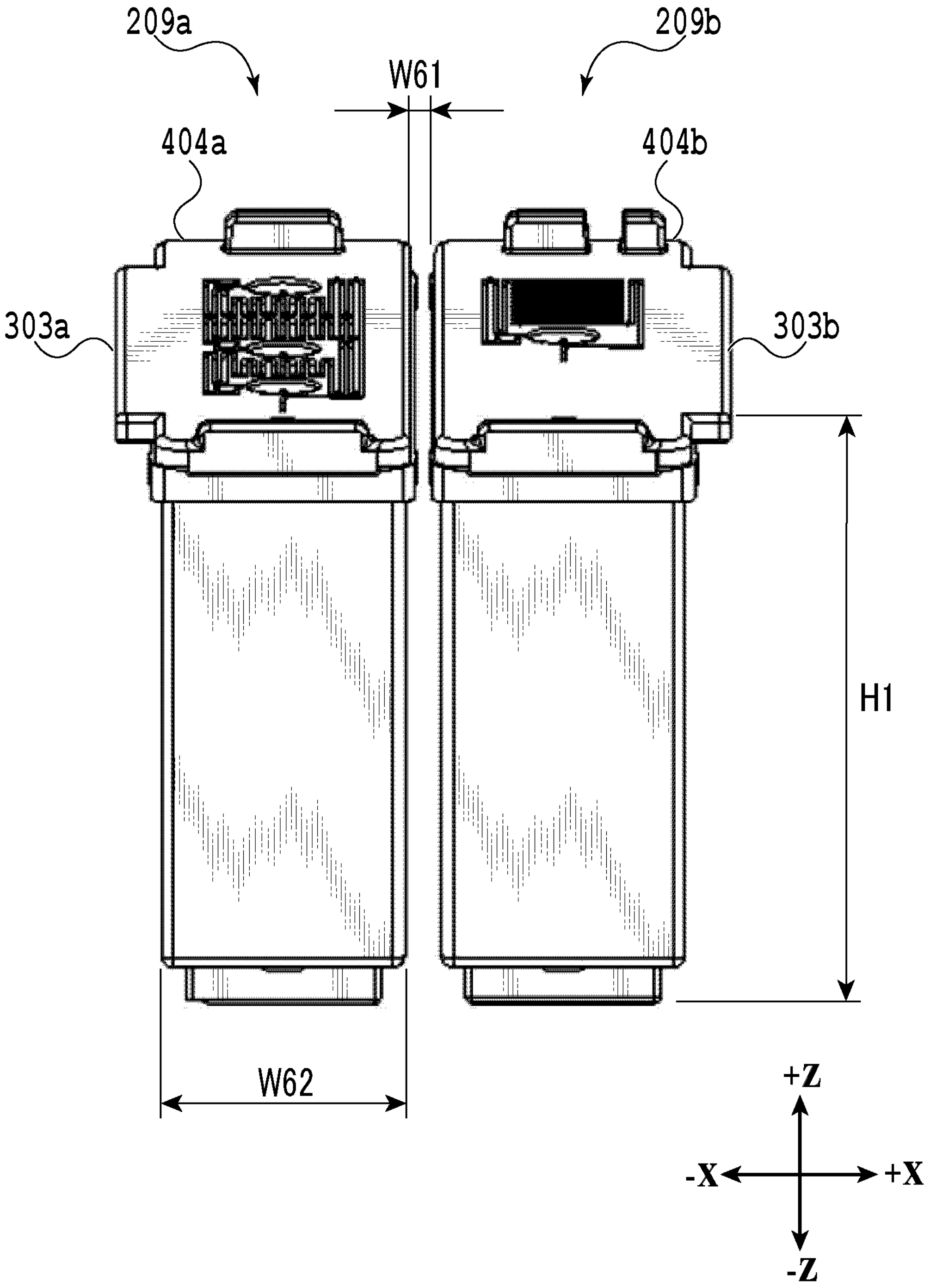
FIG. 6 is a schematic overhead view illustrating the examples of the head cartridges that can be applied to one embodiment.

FIG. 6 is a schematic overhead view of the first head cartridge 209*a* and the second head cartridge 209*b* properly attached to the carriage 104 as viewed from the upper front side of the printing apparatus. In FIG. 6, the carriage 104 is not illustrated for the convenience of explanation.

As illustrated in FIG. 6, the first head cartridge 209*a* and the second head cartridge 209*b* are arranged to be adjacent to each other in the scanning direction (+X directions). The first protruding portion 303*a* and the second protruding portion 303*b* are formed only on side surfaces where the first protruding portion 303*a* and the second protruding portion 303*b* do not interfere with each other. Specifically, the first protruding portion 303*a* is formed only on the left side surface of the first lid portion 404*a*, and the second protruding portion 303*b* is formed only on the right side surface of the second lid portion 404*b* not to interfere with the first protruding portion 303*a*. According to such a configuration, the first head cartridge 209*a* and the second head cartridge 209*b* can be arranged closer to each other than in the conventional technique.

A distance W61 from the right side surface of the first lid portion 404*a* to the left side surface of the second lid portion 404*b* in the state where the first head cartridge 209*a* and the second head cartridge 209*b* are attached to the carriage 104 is about 1.4 mm or more and about 1.8 mm or less. Specifically, the first head cartridge 209*a* and the second head cartridge 209*b* are attached to the carriage 104 while being spaced away from each other by 1.4 mm or more and 1.8 mm or less. In the present embodiment, an explanation is given assuming that the first head cartridge 209*a* and the second head cartridge 209*b* are spaced away from each other by 1.4 mm.

Moreover, in the present embodiment, the width W62 of the first head cartridge 209*a* is about 22.0 mm, and the width W62 of the second head cartridge 209*b* is about 22.0 mm. Note that the height H1 (length in the Z direction excluding projecting portions) of the first head cartridge 209*a* and the second head cartridge 209*b* is about 56.5 mm. Accordingly, an attachment portion 301 of the carriage 104 needs to have a width of about 45.4 mm (22.0 mm+1.4 mm+22.0 mm) to allow the first head cartridge 209*a* and the second head cartridge 209*b* to be attached without interfering with each other.

In the state where the first head cartridge 209*a* and the second head cartridge 209*b* are properly attached, the first protruding portion 303*a* and the second protruding portion 303*b* extend in directions away from each other. Accordingly, in the state where the first head cartridge 209*a* and the second head cartridge 209*b* are properly attached to the carriage 104, the first protruding portion 303*a* and the second protruding portion 303*b* do not come into contact with each other. An example of a conventional technique is explained below to facilitate understanding of the fact that the printing apparatus of the present embodiment can be reduced in size from that in the conventional technique.

Figure 7:
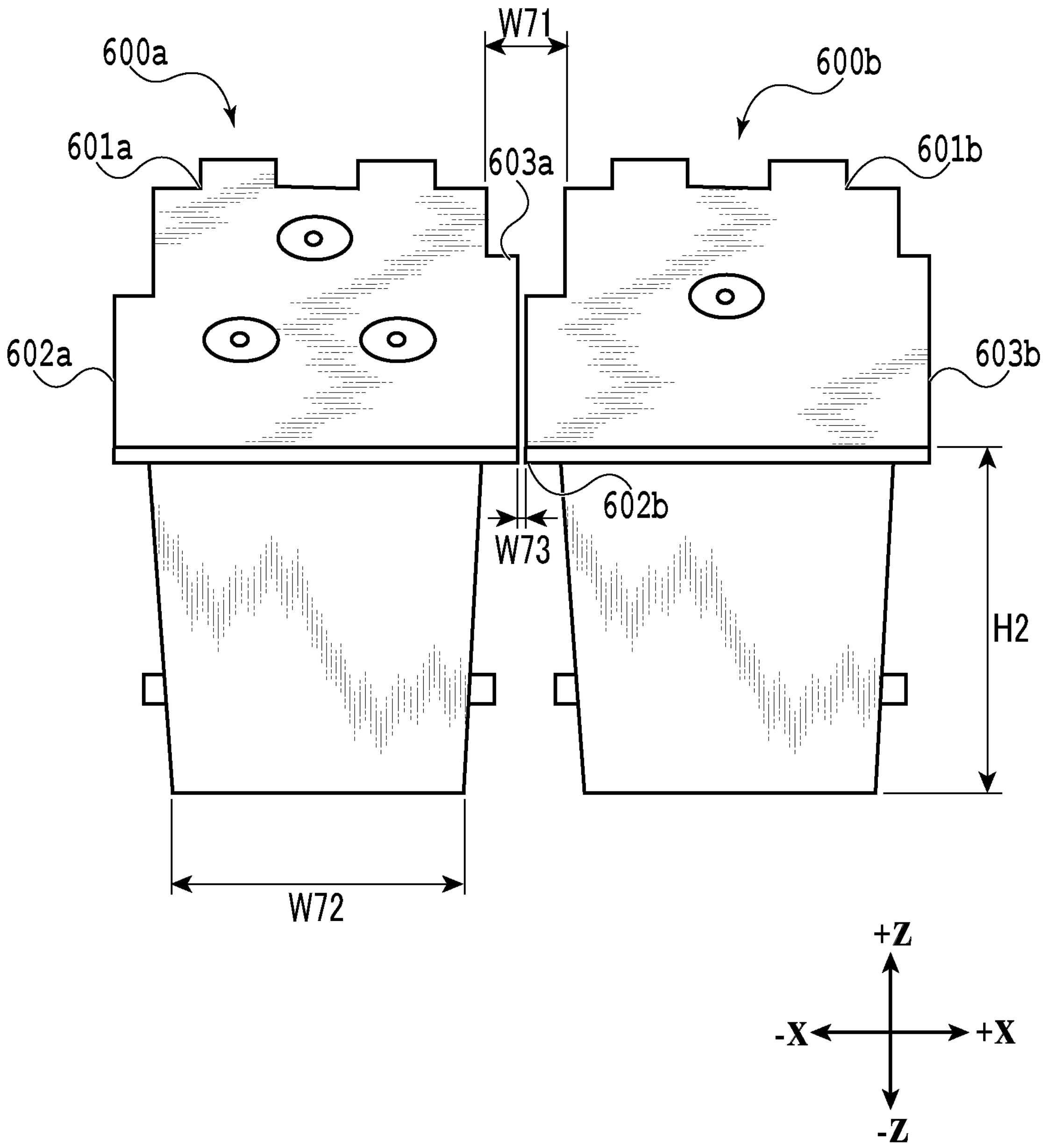
FIG. 7 is a schematic overhead view illustrating conventional head cartridges.

FIG. 7 is a schematic overhead view of two conventional head cartridges properly attached to a conventional carriage as viewed from the upper front side of a conventional printing apparatus. Note that, in FIG. 7, the carriage is not illustrated for the convenience of explanation. In FIG. 7, differences between the head cartridges of the present embodiment and the conventional head cartridges are mainly explained.

A head cartridge 600*a* illustrated in FIG. 7 corresponds to the first head cartridge 209*a* in the present embodiment. However, two liquid chambers capable of individually storing inks of two colors among the above-mentioned three colors are arranged side by side in the scanning direction (X direction) inside the head cartridge 600*a*. A head cartridge 600*b* illustrated in FIG. 7 corresponds to the second head cartridge 209*b* in the present embodiment. As illustrated in FIG. 7, the head cartridge 600*a* includes a lid portion 601*a*, and the head cartridge 600*b* includes a lid portion 601*b*. In the conventional technique, outer peripheral shapes in the lid portion 601*a* and the lid portion 601*b* are the same.

The lid portion 601*a* includes a protruding portion 602*a* on a left side surface (surface facing the −X direction in the drawings) and a protruding portion 603*a* on a right side surface (surface facing the +X direction in the drawings). The length of the protruding portion 602*a* in a depth direction in the drawing is shorter than the length of the protruding portion 603*a* in the depth direction. In such a configuration, causing the user to determine a difference in the lengths of the protruding portion 602*a* and the protruding portion 603*a* in the depth direction suppresses erroneous attachment of the head cartridge 600*a* to the carriage in the front-rear direction and the up-down direction.

The lid portion 601*b* also includes a protruding portion 602*b* and a protruding portion 603*b* like the lid portion 601*a*. Causing the user to determine a difference in the lengths of the protruding portion 602*b* and the protruding portion 603*b* in the depth direction suppresses erroneous attachment of the head cartridge 600*b* to the carriage in the front-rear direction and the up-down direction.

In the conventional technique, the right side surface of the lid portion 601*a* and the left side surface of the lid portion 601*b* need to be spaced away by about 7.5 mm to avoid interference of the head cartridge 600*a* and the head cartridge 600*b* having substantially the same shape. Specifically, in the conventional technique, a distance W71 from the right side surface (surface facing the +X direction in the drawings) of the lid portion 601*a* excluding the protruding portion 603*a* to the left side surface (surface facing the −X direction in the drawings) of the lid portion 601*b* excluding the protruding portion 602*b* is about 7.5 mm.

Moreover, the width W72 (length in the X direction excluding the protruding portion 602*a* and the protruding portion 603*a* in FIG. 7) of the head cartridge 600*a* is about 29.5 mm. The width of the head cartridge 600*b* is also about 29.5 mm like the head cartridge 600*a*. Note that a distance W73 from the right side surface of the protruding portion 603*a* to the left side surface of the protruding portion 602*b* is about 3.2 mm. The height H2 (length in the Z direction excluding projecting portions) of the head cartridge 600*a* and the head cartridge 600*b* is about 42.0 mm.

Accordingly, a width of about 66.5 mm (W72 (29.5 mm)+W71 (7.5 mm)+W72 (29.5 mm)) is necessary to attach the head cartridge 600*a* and the head cartridge 600*b* to the carriage.

Forming the protruding portions on both side surfaces of the lid portion as described above leads to an increase in the size of the carriage. Then, the increase in the size of the carriage has a possibility of also increasing the size of the entire printing apparatus. That is the explanation of the conventional technique. The configurations of the first head cartridge 209*a* and the second head cartridge 209*b* are explained again below with reference to FIGS. 4 and 5.

As described above, the width of the head cartridge in the present embodiment is less than the width of the conventional head cartridge. Specifically, the width of the head cartridge in the present embodiment is about 7.5 mm less than the width of the conventional head cartridge. Note that the height (length in the Z direction) of the first head cartridge 209*a* is about 14.5 mm greater than the head cartridge 600. This is to make the liquid storing amount in the head cartridge 209 of the present embodiment equal to the liquid storing amount in the conventional head cartridge.

In the present embodiment, the width necessary to attach the first head cartridge 209*a* and the second head cartridge 209*b* is about 45.4 mm. Meanwhile, the width necessary to attach the head cartridge 600*a* and the head cartridge 600*b* is about 66.5 mm. Accordingly, the width necessary to attach two head cartridges in the present embodiment is about 21.1 mm less than the width of the two head cartridges illustrated in FIG. 7.

Accordingly, in consideration of the fact that the carriage 104 performs reciprocate scanning to print an image on a print medium, a distance of the reciprocate scanning of the carriage 104 in the present embodiment is about 42.2 mm (21.1×2) less than a distance of the reciprocate scanning of the conventional carriage. Forming the head cartridge of the present embodiment in a shape smaller (slimmer) in the width direction than the conventional head cartridge as described above can make the sizes of the carriage and the apparatus main body smaller than those in the conventional technique.

<Suppression of Erroneous Attachment>

Figure 8:
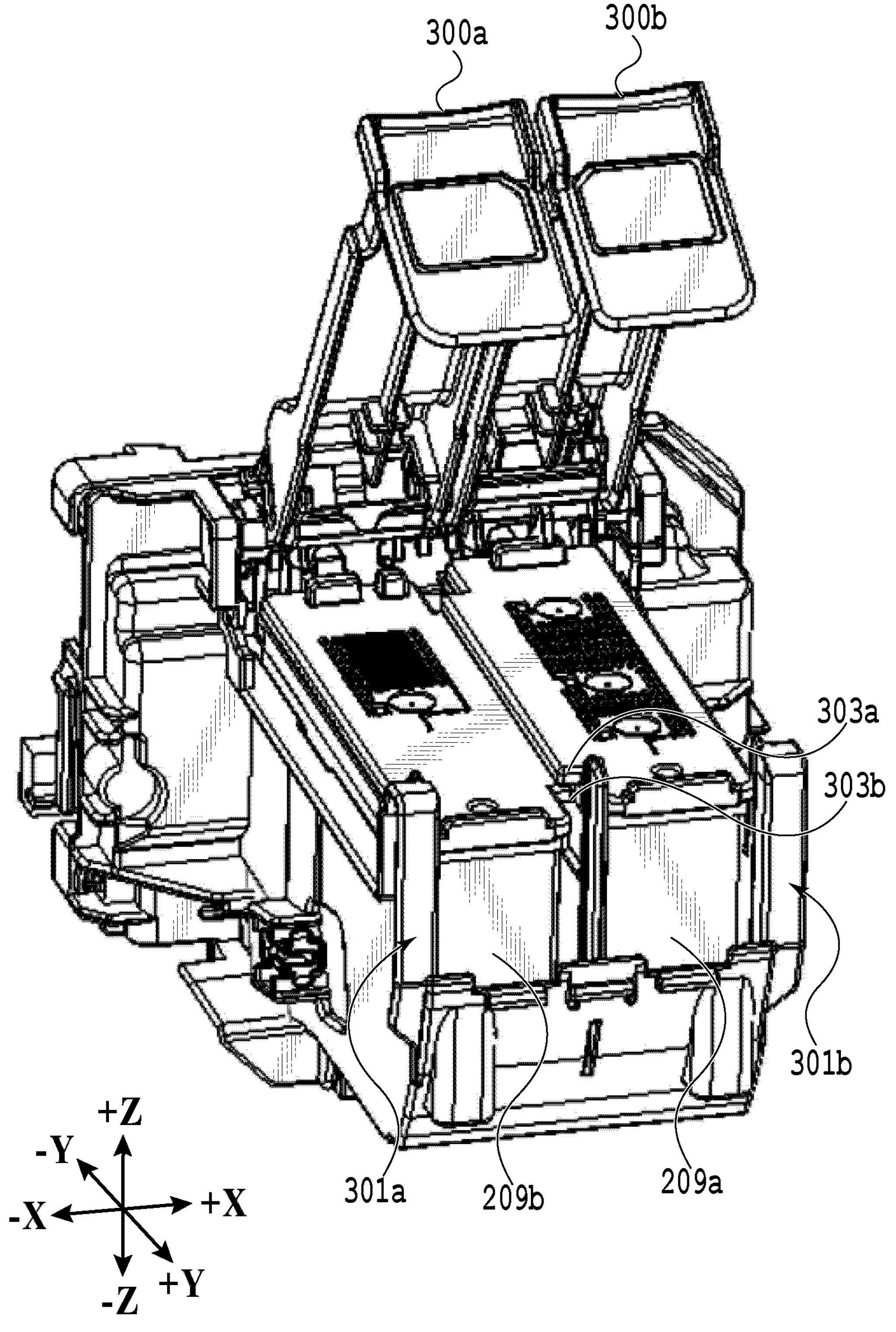
FIG. 8 is a view illustrating an example of how erroneous attachment of the head cartridges is suppressed.

FIG. 8 is a diagram illustrating how the erroneous attachment of the head cartridge is suppressed in the present embodiment. Specifically, FIG. 8 illustrates a state where the first head cartridge 209*a* is attempted to be inserted into the second attachment portion 301*b* with the second head cartridge 209*b* erroneously inserted in the first attachment portion 301*a*.

As illustrated in FIG. 8, in the state where the second head cartridge 209*b* is inserted in the first attachment portion 301*a*, the second protruding portion 303*b* protrudes in a direction (+X direction in the present example) toward the second attachment portion 301*b* adjacent to the first attachment portion 301*a*. Specifically, the second protruding portion 303*b* protrudes out on the second attachment portion 301*b* side. Accordingly, in the case when the first head cartridge 209*a* is attempted to be inserted into the second attachment portion 301*b* with the second head cartridge 209*b* inserted in the first attachment portion 301*a*, the first protruding portion 303*a* come into contact with the second protruding portion 303*b* to overlap it. The contact of the first protruding portion 303*a* with the second protruding portion 303*b* inhibits attachment of the first head cartridge 209*a* to the second attachment portion 301*b*.

Specifically, in the case when the first head cartridge 209*a* is erroneously inserted into the second attachment portion

301*b* with the second head cartridge 209*b* erroneously inserted in the first attachment portion 301*a*, the first protruding portion 303*a* laps over the second protruding portion 303*b*. Accordingly, insertion of the first head cartridge 209*a* into the second attachment portion 301*b* in an attachment direction (−Z direction in the drawings) becomes difficult.

Moreover, in the state where the first protruding portion 303*a* laps over the second protruding portion 303*b*, the second cover 300*b* cannot be closed. Note that the first cover 300*a* also cannot be closed in this state. Specifically, causing the first protruding portion 303*a* to lap over the second protruding portion 303*b* suppresses the case when the user erroneously attaches the first head cartridge 209*a* to the second attachment portion 301*b*. Note that erroneous attachment can be suppressed also in the case when the first head cartridge 209*a* is erroneously inserted into the second attachment portion 301*b* before the second head cartridge 209*b* contrary to the above example. In the case where the first head cartridge 209*a* is erroneously inserted into the second attachment portion 301*b* before the second head cartridge 209*b*, the second protruding portion 303*b* laps over the first protruding portion 303*a*. Accordingly, insertion of the second head cartridge 209*b* into the first attachment portion 301*a* in the attachment direction (−Z direction in the drawings) becomes difficult. Specifically, causing the second protruding portion 303*b* to lap over the first protruding portion 303*a* suppresses erroneous attachment of the second head cartridge 209*b* to the first attachment portion 301*a*.

Moreover, the same applies to the case when the same type of head cartridges 209 are attempted to be attached to the first attachment portion 301*a* and the second attachment portion 301*b*, respectively. For example, assume a case when two second head cartridges 209*b* are attempted to be attached to the first attachment portion 301*a* and the second attachment portion 301*b*. In this case, the second protruding portion 303*b* of the second head cartridge 209*b* attempted to be attached to the first attachment portion 301*a* protrudes on the second attachment portion 301*b* side. Accordingly, even in the case when the other second head cartridge 209*b* is attempted to be inserted into the second attachment portion 301*b*, the other second head cartridge 209*b* abuts the second protruding portion 303*b* of the second head cartridge 209*b* inserted in the first attachment portion 301*a*, and erroneous attachment can be suppressed. In this case, the second protruding portion 303*b* of the second head cartridge 209*b* erroneously inserted in the first attachment portion 301*a* comes into contact with the second head cartridge 209*b* attempted to be properly inserted into the second attachment portion 301*b*. Specifically, forming the second protruding portion 303*b* in an upper portion of the second head cartridge 209*b* can also suppress erroneous attachment of the two second head cartridges 209*b*. The same applies to the case when two first head cartridges 209*a* are attempted to be attached to the first attachment portion 301*a* and the second attachment portion 301*b*.

As explained above, according to the technique of the present disclosure, in the case when one of the two head cartridges is erroneously inserted into the attachment portion, the protruding portion included in the erroneously-inserted head cartridge comes into contact with part of the other head cartridge. In this state, the cover cannot be closed. In other words, the two cartridges come into contact with each other and inhibit closing of the cover unless the two head cartridges are both inserted at proper positions.

Furthermore, in the case when the two head cartridges are properly attached, the protruding portions included in the respective cartridges protrude in directions opposite to each other. Accordingly, the interval between the adjacent two head cartridges can be made smaller than the interval in the conventional technique. This can reduce the distance of reciprocate scanning by the carriage in printing of an image to a regular-size sheet, from that in the conventional technique. Accordingly, it is possible to improve printing speed and to reduce the size of the printing apparatus main body.

In addition, each of the first protruding portion and the second protruding portion functions as a finger putting portion in removal of a corresponding one of the first head cartridge and the second head cartridge. Furthermore, removing both of the first head cartridge and the second head cartridge simultaneously by putting the fingers on both of the first protruding portion and the second protruding portion is easier than in the conventional technique. Moreover, the position where the first protruding portion is formed and the position where the second protruding portion is formed are clearly different from each other. Accordingly, the user can distinguish the first head cartridge and the second head cartridge from each other by tactile sensation. This can further suppress a case when the user erroneously attaches the head cartridges to the carriage.

Thus, according to the head cartridges of the present embodiment, it is possible to avoid erroneous attachment of multiple cartridges without causing a size increase of the printing apparatus.

Second Embodiment

A second embodiment in the technique of the present disclosure is explained below with reference to the drawings. The head cartridges in the first embodiment and head cartridges in the present embodiment have in common that they can both store liquids.

However, the head cartridges of the present embodiment are different from the head cartridges in the first embodiment in that, while the predetermined amounts of liquids are stored in the head cartridges of the first embodiment in advance, the liquids are supplied from liquid tanks to the head cartridges of the present embodiment via tubes. In the following explanation, configurations similar or corresponding to the configurations in the first embodiment are denoted by the same reference numerals with explanation thereof omitted, and different points are mainly explained.

Figure 9:
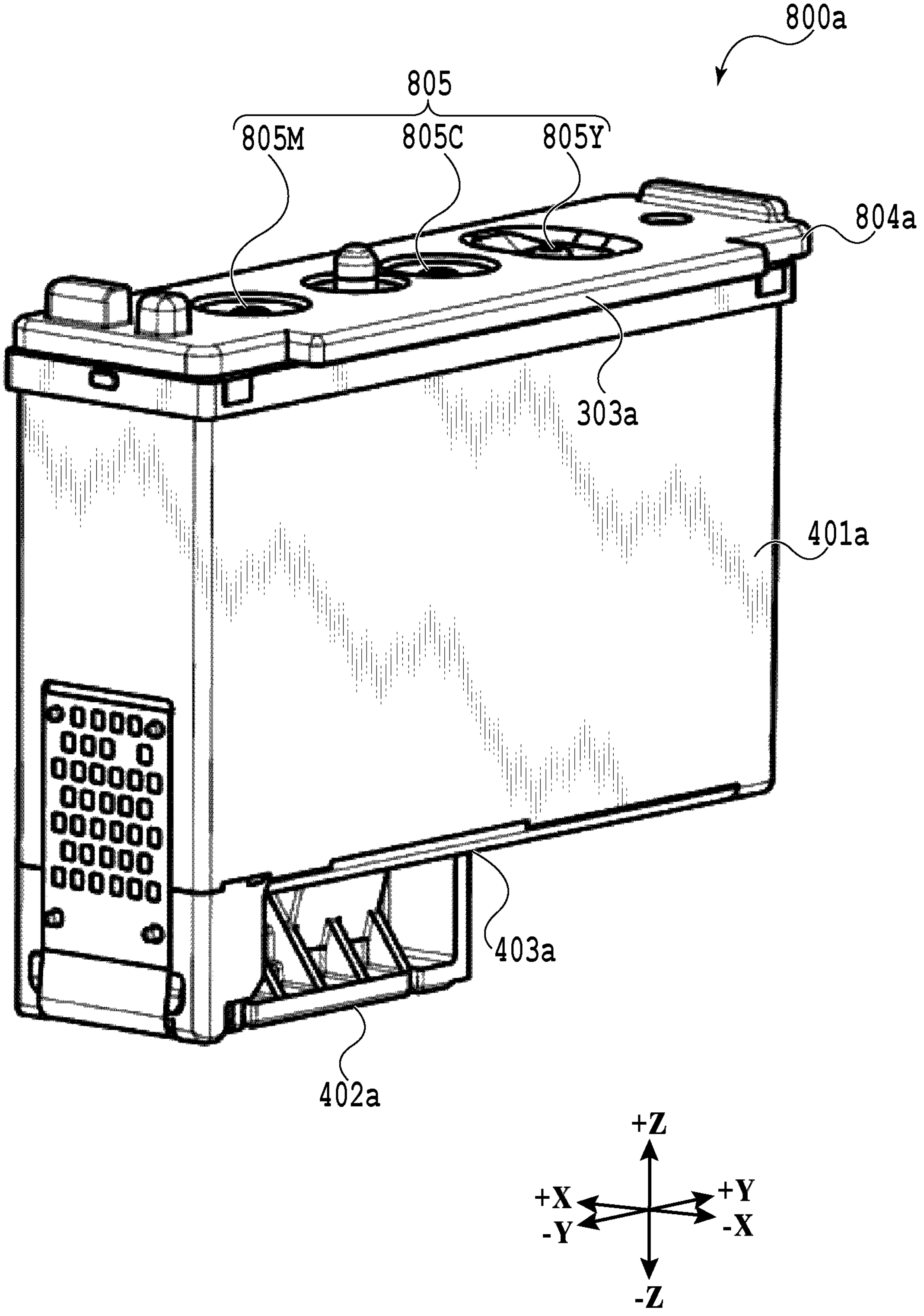
FIG. 9 is an outer appearance perspective view illustrating an example of a head cartridge that can be applied to one embodiment.

FIG. 9 is an outer appearance perspective view of a third head cartridge 800*a* that can be applied to the present embodiment.

As illustrated in FIG. 9, the third head cartridge 800*a* includes the first storing portion 401*a* capable of storing the first type of liquid and the first ejection portion 402*a* capable of ejecting the first type of liquid. Moreover, the third head cartridge 800*a* includes the first flow channel portion 403*a*, in which the flow channels connecting the first storing portion 401*a* and the first ejection portion 402*a* are formed.

In the present embodiment, the third head cartridge 800*a* includes a third lid portion 804*a* covering the opening formed in the upper portion of the first storing portion 401*a*. The first protruding portion 303*a* protruding in the first direction (−X direction in the drawings in the present example) is formed on a first side surface (left side surface facing the −X direction in the drawings in the present example) of the third lid portion 804*a*.

The third lid portion 804*a* includes a connecting portion 805, to which end portions of the tubes (not illustrated) for supplying the liquids from the liquid tanks (for example, not-illustrated ink tanks) fixed at fixing positions in the printing apparatus to the first storing portion 401a can be connected.

The connecting portion 805 includes a first connecting portion 805M, a second connecting portion 805C, and a third connecting portion 805Y. An end portion of a tube that can supply the ink of magenta color can be connected to the first connecting portion 805M. An end portion of a tube that can supply the ink of cyan color can be connected to the second connecting portion 805C. An end portion of a tube that can supply the ink of yellow color can be connected to the third connecting portion 805Y.

Figure 10:
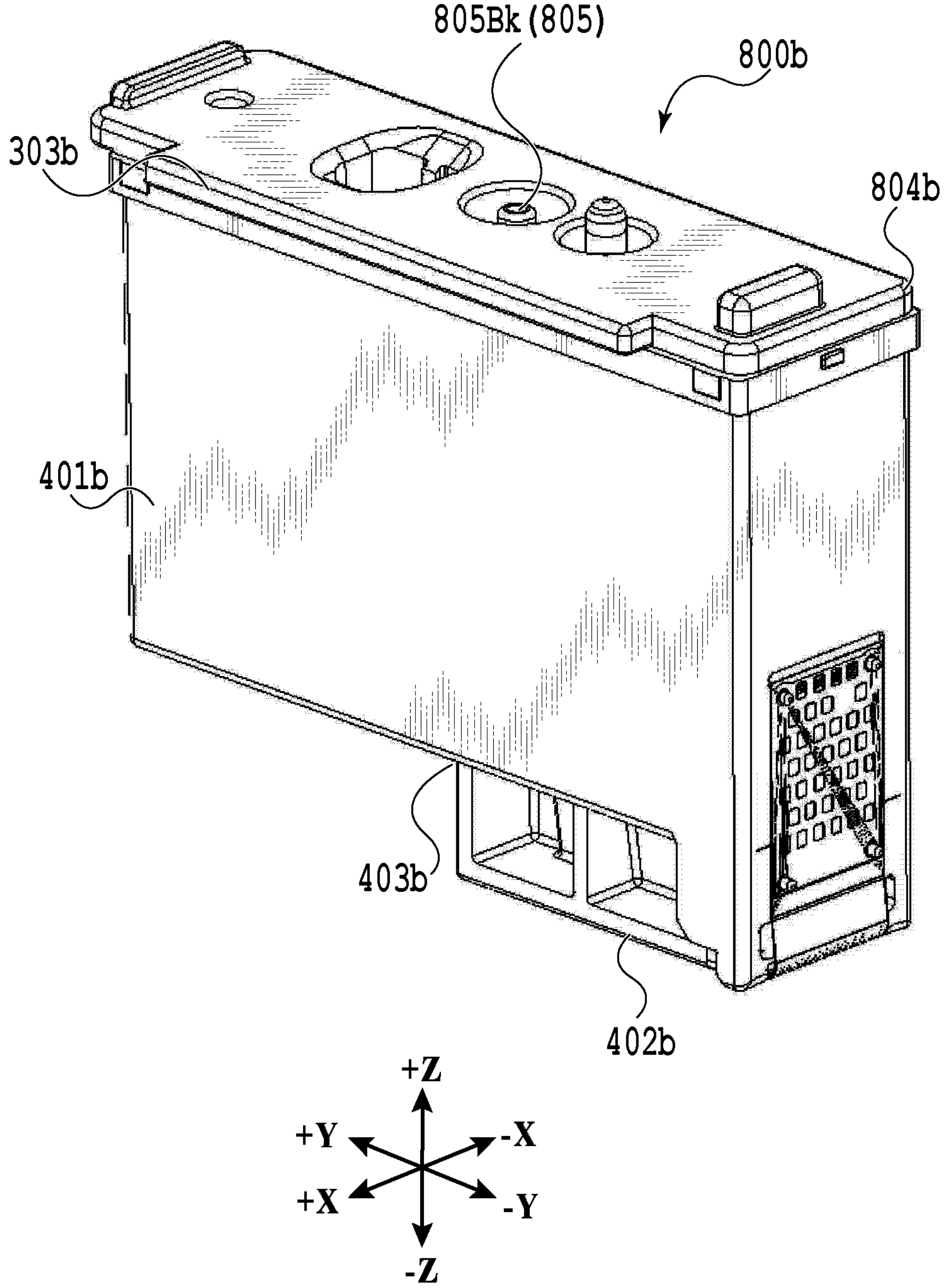
FIG. 10 is an outer appearance perspective view illustrating an example of a head cartridge that can be applied to one embodiment.

FIG. 10 is an outer appearance perspective view of a fourth head cartridge 800b that can be applied to the present embodiment.

As illustrated in FIG. 10, the fourth head cartridge 800b includes the second storing portion 401b capable of storing the second type of liquid and the second ejection portion 402b capable of ejecting the second type of liquid. Furthermore, the fourth head cartridge 800b includes the second flow channel portion 403b, in which the flow channels connecting the second storing portion 401b and the second ejection portion 402b are formed.

In the present embodiment, the fourth head cartridge 800b includes a fourth lid portion 804b covering the opening portion formed in the upper portion of the second storing portion 401b. The second protruding portion 303b protruding in the second direction (+X direction in the drawings in the present example) is formed on a first side surface (right side surface facing the +X direction in the drawings in the present example) of the fourth lid portion 804b.

The fourth lid portion 804b includes a fourth connecting portion 805BK as the connecting portion 805, to which an end portion of a tube (not illustrated) for supplying the liquid from a liquid tank (for example, a not-illustrated ink tank) fixed at a fixing position in the printing apparatus to the second storing portion 401b can be connected. The end portion of the tube that can supply the ink of black color can be connected to the fourth connecting portion 805BK.

As described above, the same effects as those in the first embodiment also can be obtained in the multiple head cartridges in which the liquids are continuously supplied from the liquid tanks to the storing portions via the tubes, by providing the first protruding portion 303a and the second protruding portion 303b in the respective head cartridges.

Other Embodiment

In the above embodiments, the protruding portions are formed in the lid portions. However, the protruding portions do not have to be formed in the lid portions as long as the protruding portions formed in the respective two lid portions extend in directions away from each other, and can suppress erroneous attachment of each of the two head cartridges. For example, the configuration may be such that the first protruding portion is formed on the left side surface of the first storing portion, and the second protruding portion is formed on the right side surface of the second storing portion. Erroneous attachment of each of the two head cartridges can be suppressed also in such a configuration.

According to the technique of the present disclosure, it is possible to avoid erroneous attachment of multiple cartridges.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A cartridge set comprising:

a first cartridge attachable to a first attachment portion included in a printing apparatus; and a second cartridge attachable to a second attachment portion that is included in the printing apparatus and that is adjacent to the first attachment portion, wherein the first cartridge includes a first protruding portion, the second cartridge includes a second protruding portion, the first protruding portion protrudes in a direction away from the second attachment portion in a state where the first cartridge is attached to the first attachment portion, the second protruding portion protrudes in a direction away from the first attachment portion in a state where the second cartridge is attached to the second attachment portion, and one of the first protruding portion and the second protruding portion overlaps the other in a state where the second cartridge is inserted in the first attachment portion and the first cartridge is inserted in the second attachment portion.

2. The cartridge set according to claim 1, wherein the first protruding portion:

protrudes in an opposite direction to a direction in which the second attachment portion is located in the state where the first cartridge is attached to the first attachment portion, and protrudes from the second attachment portion toward the first attachment portion in the state where the first cartridge is inserted in the second attachment portion, and the second protruding portion:

protrudes in an opposite direction to a direction in which the first attachment portion is located in the state where the second cartridge is attached to the second attachment portion, and protrudes from the first attachment portion toward the second attachment portion in the state where the second cartridge is inserted in the first attachment portion.

3. The cartridge set according to claim 1, wherein the first protruding portion is arranged in an upper portion of a side surface of the first cartridge.

4. The cartridge set according to claim 1, wherein the first cartridge further includes:

a first storing portion capable of storing a chromatic color ink, and a first ejection element substrate capable of ejecting the chromatic color ink stored in the first storing portion to a print medium, and the second cartridge further includes:

a second storing portion capable storing an ink of black color, and a second ejection element substrate capable of ejecting the ink of black color stored in the second storing portion to the print medium.

5. The cartridge set according to claim 4, wherein the first protruding portion is arranged in a first lid portion covering an upper portion of the first storing portion.

6. The cartridge set according to claim 4, further comprising:

a first connecting portion to which a first tube for supplying the chromatic color ink from a liquid tank included in the printing apparatus to the first storing portion is connectable; and a second connecting portion to which a second tube for supplying the ink of black color from a liquid tank included in the printing apparatus to the second storing portion is connectable.

7. A printing apparatus comprising:

a first attachment portion to which a first cartridge storing a first type of liquid is attachable; and a second attachment portion to which a second cartridge storing a second type of liquid different from the first type of liquid is attachable, the second attachment portion being adjacent to the first attachment portion, wherein the first cartridge includes a first protruding portion configured to come into contact with the second cartridge attempted to be inserted into the first attachment portion in a state where the first cartridge is inserted in the second attachment portion, and the second cartridge includes a second protruding portion configured to come into contact with the first cartridge attempted to be inserted into the second attachment portion in a state where the second cartridge is inserted in the first attachment portion.

8. The printing apparatus according to claim 7, wherein the first type of liquid is a chromatic color ink, and the second type of liquid is an ink of black color.

9. The printing apparatus according to claim 7, wherein the first protruding portion:

protrudes in an opposite direction to a direction in which the second attachment portion is located in a state where the first cartridge is attached to the first attachment portion, and protrudes from the second attachment portion toward the first attachment portion in the state where the first cartridge is inserted in the second attachment portion, and the second protruding portion:

protrudes in an opposite direction to a direction in which the first attachment portion is located in a state where the second cartridge is attached to the second attachment portion, and protrudes from the first attachment portion toward the second attachment portion in a state where the second cartridge is inserted in the first attachment portion.

10. The printing apparatus according to claim 7, wherein the first protruding portion is arranged in an upper portion of a side surface of the first cartridge.

11. The printing apparatus according to claim 7, wherein the first protruding portion is arranged in a first lid portion covering an upper portion of a first storing portion capable of storing the first type of liquid.

12. The printing apparatus according to claim 7, further comprising:

a first connecting portion to which a first tube for supplying the first type of liquid from a liquid tank included in the printing apparatus to an inside of the first cartridge is connectable; and a second connecting portion to which a second tube for supplying the second type of liquid from a liquid tank included in the printing apparatus to an inside of the second cartridge is connectable.

13. The printing apparatus according to claim 7, further comprising a carriage movable in a scanning direction, the carriage including the first attachment portion and the second attachment portion.

14. The printing apparatus according to claim 13, wherein the carriage includes:

a first cover movable between a fixing position where the first cover fixes the first cartridge attached to the first attachment portion and a release position where the first cartridge is released, and a second cover movable between a fixing position where the second cover fixes the second cartridge attached to the second attachment portion and a release position where the second cartridge is released, wherein the first cover is configured to be unmovable from the release position to the fixing position in a state where the second cartridge is inserted in the first attachment portion, and the second cover is configured to be unmovable from the release position to the fixing position in a state where the first cartridge is inserted in the second attachment portion.

* * * * *